June 16, 1964     E. B. NICHOLS     3,137,166
PLASTIC CHAINS
Filed May 2, 1955

INVENTOR
EDGAR B. NICHOLS
BY
ATTORNEYS

United States Patent Office 3,137,166
Patented June 16, 1964

3,137,166
PLASTIC CHAINS
Edgar B. Nichols, 325 W. Main St., Moorestown, N.J.
Filed May 2, 1955, Ser. No. 505,409
1 Claim. (Cl. 74—250)

This invention relates to plastic chains.

Both driving chains and conveyor chains have heretofore been made of plastic materials in lieu of metals for use in situations where metals are unsuitable, primarily by virtue of the fact that ferrous metals are subject to corrosion, whereas plastics having considerable tensile strength can be formulated which are not affected by moisture or the acids and alkalis commonly used in industrial processes.

Such chains as heretofore manufactured have followed the design of the metal chains for which they are substituted and have therefore been either unduly costly or defective for one reason or another because of the difference in physical properties of metal and plastic.

The object of the present invention is to provide plastic chains designed to take advantage of the particular physical characteristics of plastic materials both from the standpoint of manufacture and the utility of the finished chain. By my invention plastic chains may be made which are stronger than metal chains of comparable weight and cost and are by virtue of the fact that the parts of the chain may be molded to any desired shape, more serviceable for many purposes than like chains made of metal.

Figure 1:
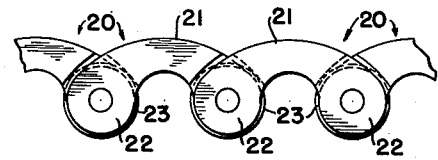
Figure 2:
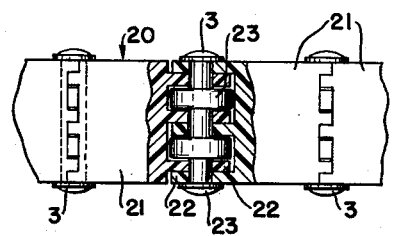
Figure 3:
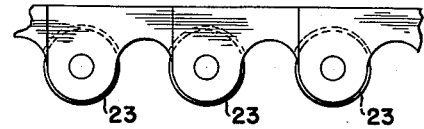

In the accompanying drawings I have illustrated a preferred form of my improved plastic chain, and in the said drawings:

FIG. 1 is a side elevation of said chain;
FIG. 2 is a plan view partly in section; and
FIG. 3 is a side elevation of a modification.

My improved chain consists of solid links the full width of the chain and preferably of molded plastic.

Referring to FIG. 1 each of the links 20, which are identical throughout the entire chain, comprises a middle portion 21 with a series of downwardly extending staggered projections 22, which projections are of a shape and dimensions to fit together in alignment when the links are assembled. In each row of staggered projections 22 two projections are cut away to provide spaces for bearing rollers 23 which when the chain is assembled, are supported on the cross pins 3 as shown particularly in FIG. 2. As shown in FIG. 1 the rollers 23 are of somewhat larger diameter than the circular portions of the projections 22 and therefore provide the contacting surfaces for the teeth of the driving sprockets. The construction is particularly useful where the chains are used as conveyors and run between sprockets on tracks or other supports. The rollers 23 may be also made of plastic or other materials than metal so as to be readily replaceable when worn to thereby project the chain proper from wear. In the form of chain shown in FIG. 3 the links are so designed as to provide a continuous flat upper surface with the joints of the chain defined by transversely extending flat vertical faces of the adjacent links.

Any desired material may be used for the chain links, the selection of material being largely determined by the use to which the chain is put. I have found the molding compound sold under the trade name "Zytel" nylon to be particularly suitable as it is readily shaped by extrusion or injection molding, has high tensile strength, requires no lubrication and is not subject to corrosion.

It will be noted in FIG. 1 that the mid portion of the links is bowed upwardly, out of line with the connecting pins. When the links are formed of the nylon above described they can be elongated to a significant extent by direct pull on a chain of such links without exceeding the elastic limit of the material, and such chains will safely absorb the starting load, when used for power transmission under conditions which rupture a chain with flat links, but otherwise the same.

In the foregoing specification I have described two forms of my improved chain but it will be understood that my invention is not limited to the specific structures disclosed except insofar as defined in the appended claim.

I claim:

A sprocket chain formed of molded plastic links, each link consisting of a single integral piece having end portions shaped to interfit with the end portions of the adjacent links and form transverse bores extending across the width of the chain and pivoted pins in said bores, the end portions of the links being provided with projections shaped to form wheel engaging teeth extending transversely the full width of the chain with the transverse faces of the projections on adjacent links in alignment when the links are at a predetermined angle to each other about the axis of the pivot pin and rollers mounted on the pivot pins in recesses formed in the end portions of links, the rollers having a radius greater than the radial dimensions of the end portions on one side of the pivot pins whereby the peripheral faces of the rollers engage the teeth of the driving sprocket.

References Cited in the file of this patent
UNITED STATES PATENTS

| | | |
|---|---|---|
| 268,883 | Gowan | Dec. 12, 1882 |
| 327,446 | Knowlton | Sept. 29, 1883 |
| 1,693,431 | Behning | Nov. 27, 1928 |
| 1,709,802 | Muller | Apr. 16, 1929 |
| 1,769,336 | Detaint | July 1, 1930 |
| 2,097,534 | Rossman | Nov. 2, 1937 |
| 2,322,466 | Perry | June 22, 1943 |
| 2,375,170 | McNeil | May 1, 1945 |
| 2,453,540 | Reid | Nov. 9, 1948 |
| 2,460,524 | Morin | Feb. 1, 1949 |
| 2,602,345 | Braumiller | July 8, 1952 |
| 2,645,133 | David | July 14, 1953 |
| 2,737,755 | Schigas | Mar. 13, 1956 |
| 2,751,065 | Thomson | June 19, 1956 |
| 2,769,346 | Flocke | Nov. 6, 1956 |
| 2,911,091 | Imse | Nov. 3, 1959 |

FOREIGN PATENTS

| | | |
|---|---|---|
| 22,163 | Great Britain | 1912 |
| 979,878 | France | Dec. 13, 1950 |

OTHER REFERENCES

Bulletin 55–65 published by Chain Belt Company, Milwaukee 1, Wisconsin, November 4, 1954, entitled "Now Nylon Table Top Chain" (5 pages).